(12) United States Patent
Takao (10) Patent No.: US 8,468,327 B2
(45) Date of Patent: Jun. 18, 2013

(54) PROCESSOR TEST APPARATUS, PROCESSOR TEST METHOD, AND PROCESSOR TEST PROGRAM (75) Inventor: Hiroshi Takao, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 768 days.

(21) Appl. No.: 12/644,822

(22) Filed: Dec. 22, 2009

(65) Prior Publication Data

US 2010/0169621 A1 Jul. 1, 2010

(30) Foreign Application Priority Data

Dec. 26, 2008 (JP) ................................. 2008-335280

(51) Int. Cl.
G06F 7/38 (2006.01)
G06F 9/00 (2006.01)
G06F 9/44 (2006.01)
G06F 15/00 (2006.01)

(52) U.S. Cl.
USPC ....................................... 712/227

(58) Field of Classification Search
None
See application file for complete search history.

(56) References Cited

U.S. PATENT DOCUMENTS 4,490,783 A * 12/1984 McDonough et al. ........ 712/227
6,918,031 B2 * 7/2005 Wilson .......................... 712/226
2004/0024995 A1 * 2/2004 Swaine .......................... 712/227

FOREIGN PATENT DOCUMENTS

JP S59-121440 A 7/1984
JP 63-193235 8/1988
JP 01-306932 12/1989
JP H06-056588 7/1994

OTHER PUBLICATIONS

"Japanese Office Action" mailed by JPO and corresponding to Japanese application No. 2008-335280 on Mar. 12, 2013, with English translation.

* cited by examiner

Primary Examiner — Corey S Faherty
(74) Attorney, Agent, or Firm — Fujitsu Patent Center (57) ABSTRACT A processor test method of testing a processor includes executing each test instruction of a test instruction sequence to obtain a condition code set by a condition code setting instruction of the test instruction sequence for testing the processor; producing a condition branching instruction to add the produced condition branching instruction to the end of the condition code setting instruction of the test instruction sequence, the condition branching instruction branching to an error output instruction when a condition code that does not match the obtained condition code is supplied; and executing, by an advanced control scheme, a test instruction sequence in which the condition branching instruction is added to the test instruction sequence.

11 Claims, 10 Drawing Sheets

Table 91:

| RANDOM NUMBER | INSTRUCTION FORMAT |
|---|---|
| 000 | ADD  ADDITION |
| 001 | SLL  LOGIC LEFTWARD SHIFT |
| 002 | Bicc  BRANCHING BY INTEGRAL CONDITION CODE |
| ⋮ | ⋮ |
| FFF | Fprop  FLOATING DECIMAL POINT INSTRUCTION |

Table 92:

| RANDOM NUMBER | OPERAND |
|---|---|
| 000 | 001110100101001101001110100000111 |
| 001 | 110000001010110000000000000000000 |
| 002 | 001110100101001101001110100110111 |
| ⋮ | ⋮ |
| FFF | 010011010011101010011010011101011 |

PROCESSOR TEST APPARATUS, PROCESSOR TEST METHOD, AND PROCESSOR TEST PROGRAM

CROSS-REFERENCE TO RELATED APPLICATIONS

This application is based upon and claims the benefit of priority of the prior Japanese Patent Application No. 2008-335280, filed on Dec. 26, 2008, the entire contents of which are incorporated herein by reference.

FIELD

Embodiments of the present invention discussed herein relate to a processor test apparatus, a processor test method, and a processor test program.

BACKGROUND

A random test is performed for testing a processor. In the random test, a random instruction sequence including input data is produced based on a pseudo random number. A processor that is a device to be tested is caused to execute the produced instruction, thereby determining validity of an instruction execution result.

A method in which a test instruction is produced based on a random number has been proposed. In such test, an expected value produced by a simulation and a test instruction execution result of the device to be tested are compared to each other, and an advanced control function concerning a branching instruction is tested. In the test, a test instruction is produced, while an instruction for setting a condition code is produced as one of the randomly-produced test instructions. In the test instruction, a conditional branching instruction is added to the end of the condition code, and a branching failure instruction and a branching success instruction are added to the end of the conditional branching instruction. When the test instruction having the defined number of instructions is produced, the simulation is performed on one test instruction in the produced test instruction at a time. Then, the expected value is obtained by executing the test instruction sequence, and the expected value and the result value obtained by actually executing the test instruction are compared with each other to perform the test of the data processing device to be tested. When the expected value and the result value do not match each other, a signal indicating an error is outputted.

In the test, in order to exert a maximum capability of the advanced control function, a branching success instruction is operated after the subsequent branching failure instruction is operated in advance until a stage at which the condition code of the conditional branching instruction is set. For example, see Japanese patent Publication No. 6-56588.

In the test instruction, there are many condition code setting instructions whose results are expressed by the condition codes. In executing the test instruction, the condition code stored in a register is overwritten and changed every time the condition code setting instruction is executed. Accordingly, in cases where the result value at the end of the actual test instruction sequence and the expected value obtained by performing the simulation are compared to each other, it is impossible to recognize a setting error of the condition code in the middle of the test instruction sequence. When the result value and the expected value are compared at the end of the test instruction sequence, it is impossible to determine which condition code setting instruction in the test instruction sequence caused an error because the register is overwritten by the result of the instruction subsequent to the condition code setting. When the test is performed while a branching instruction comparing the results is added to the test instruction sequence every time the condition code setting instruction is executed such that the condition code is not overwritten, the advanced control function is interrupted by the branching instruction.

SUMMARY

According to an embodiment of the invention, a processor test method of testing a processor includes executing each test instruction of a test instruction sequence to obtain a condition code set by a condition code setting instruction of the test instruction sequence for testing the processor; producing a condition branching instruction to add the produced condition branching instruction to the end of the condition code setting instruction of the test instruction sequence, the condition branching instruction branching to an error output instruction when a condition code that does not match the obtained condition code is supplied; and executing, by an advanced control scheme, a test instruction sequence in which the condition branching instruction is added to the test instruction sequence.

DESCRIPTION OF EMBODIMENTS

Test apparatuses according to embodiments of the invention will be described below with reference to the drawings.

Figure 1:
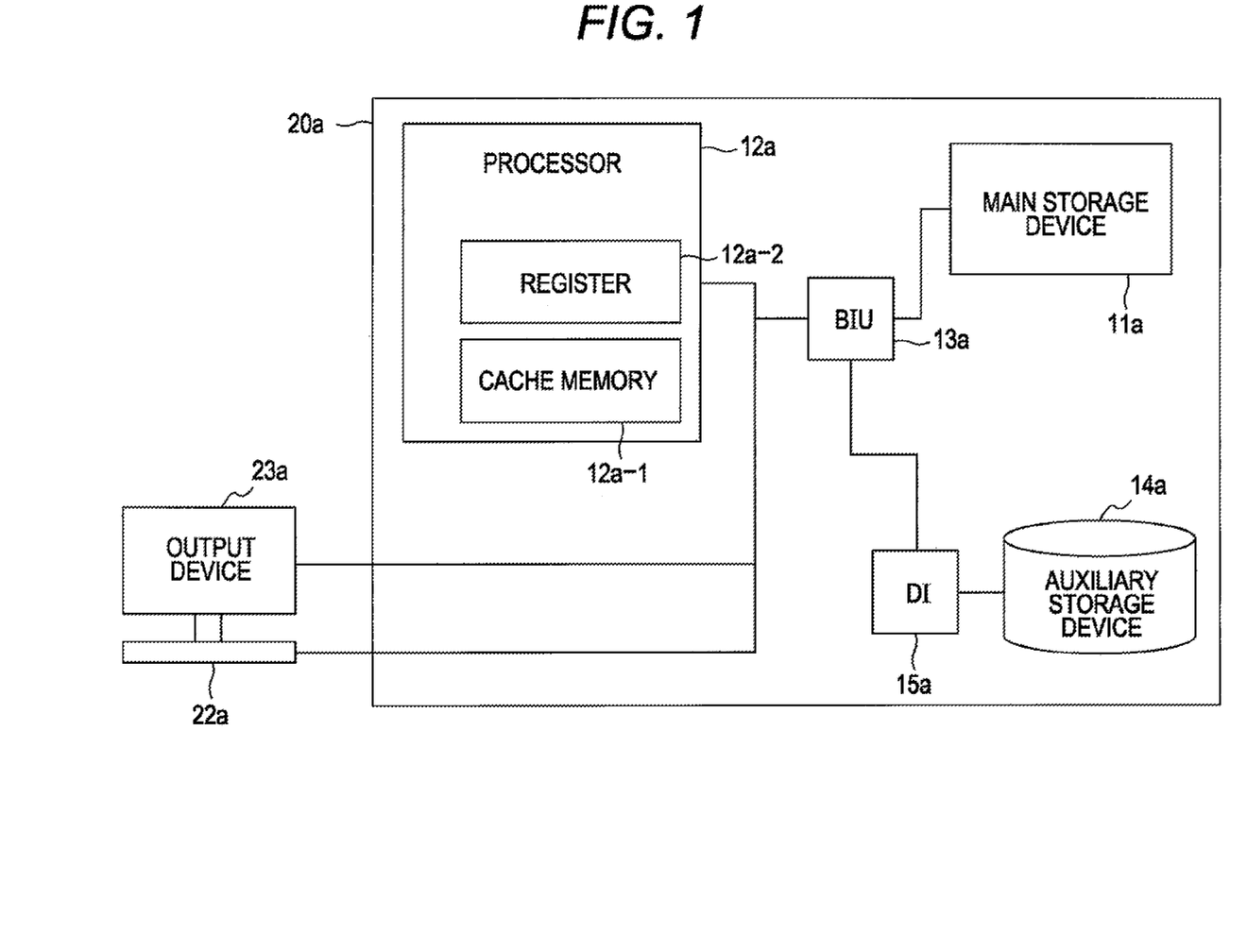
FIG. 1 illustrates a hardware configuration of a processor test apparatus according to a first embodiment of the invention.

A hardware configuration of a processor test apparatus according to a first embodiment of the invention will be described with reference to FIG. 1. A processor test apparatus 20a includes a main storage device 11a, a processor 12a, a bus interface unit (BIU) 13a, an auxiliary storage device 14a, and a disk interface (DI) 15a. In FIG. 1, the processor 12a is a device to be tested. Therefore, the processor test apparatus 20a acts as a processor test apparatus testing the processor 12a that is the device to be tested.

The main storage device 11a includes a main memory, a cache memory, and a flash memory. A command and data are stored in the main storage device 11a. Examples of the main memory include SIMM (Single Inline Memory Module) and DIMM (Dual Inline Memory Module). EPROM (Erasable Programmable ROM) is cited as an example of the flash memory in FIG. 1.

The processor 12a performs arithmetic processing such as arithmetic operations and logic operations. The processor 12a executes a compiling program to convert a program written in a programming language into an instruction coded in a machine language that can directly be executed by the processor 12a. The processor 12a reads the instruction coded in the machine language from the main storage device 11a, or the processor 12a stores the instruction coded in the machine language in a register 12a-2 of the processor 12a during executing the program. The processor 12a performs the arithmetic processing by executing an instruction stored in the register 12a-2, thereby performing various kinds of computation and control.

The processor 12a includes a cache memory 12a-1 and the register 12a-2. The cache memory 12a-1 is a high-speed, small-capacity memory that partially retains data stored in the main storage device 11a in order to make up a difference between an operation speed of the processor 12a and a data read speed from the main storage device 11a. The cache memory 12a-1 may separately be disposed outside the processor 12a. The register 12a-2 is a storage device that is used to temporarily retain a computation result of the processor 12a, to retain an address when the data is written in or read from the main storage device 11a, and/or to retain an operating state of the processor 12a, input device 22a, or output device 23a. The register 12a-2 is operated at an extremely high speed because the register 12a-2 may be mounted as a storage element. However, the register 12a-2 has a capacity smaller than that of the cache memory 12a-1.

In order to test the processor 12a, the processor test apparatus 20a causes the processor 12a to execute a program testing program stored in the auxiliary storage device 14a. The processor 12a executes the program testing program to produce a test instruction sequence, and the processor 12a executes the produced test instruction sequence thus allowing the performance of the test regarding an advanced control scheme of the processor 12a.

The bus interface unit (BIU) 13a is a chip set that is connected to the main storage device 11a, the processor 12a, and the disk interface 15a. The bus interface unit 13a includes a control circuit that is operated pursuant to a standard such as AGP (Accelerated Graphics Port) or PCI Express. The bus interface unit 13a also includes circuits for a PCI (Peripheral Component Interconnect) bus, an IDE (Integrated Drive Electronics), a keyboard port, a mouse port, and a USB. The bus interface unit 13a is connected to an input device 22a and an output device 23a through a bus. The input device 22a and the output device 23a are disposed outside the processor test apparatus 20a. The bus interface unit 13a may be divided into at least a high-speed communication set chip and a low-speed communication set chip according to a communication speed of the target device connected through the bus.

The output device 23a may be a display unit or a printer, which supplies a processing status or processing result from the processor test apparatus. The input device 22a may be a keyboard or a mouse, which supplies information to the processor test apparatus 20a.

Examples of the auxiliary storage device 14a include SSD (Solid State Drive) in which a nonvolatile memory such as a magnetic disk drive and a flash memory is used, or an optical disk drive. The auxiliary storage device 14a may read the data from a storage medium such as a magnetic disk and an optical disk, and the auxiliary storage device 14a may record the data in the storage medium. A processor test program 30a and/or a processor test program 30b is read from the storage medium, and the read program may be stored in the magnetic disk drive or SSD.

The disk interface (DI) 15a is a circuit that connects the processor 12a and the auxiliary storage device 14a. The disk interface 15a is operated pursuant to a standard such as Serial ATA, SCSI, and FC (Fibre Channel).

A functional configuration implemented by the processor test apparatus of the first embodiment will be described with reference to FIG. 2. The function implemented by the processor 12a includes a control function unit 31a, a random number generating function unit 32a, a test instruction producing function unit 33a, a condition code obtaining function unit 34a, a condition branching instruction adding function unit 36a, a test instruction executing function unit 37a, a result comparing function unit 38a, and an error processing function unit 39a. An expected value storage unit 40a, a result value storage unit 41a, and an error storage unit 42a are storage regions allocated to the main storage device 11a. An expected value supplied from the condition code obtaining function unit 34a is stored in the expected value storage unit 40a. A result value supplied from the test instruction executing function unit 37a is stored in the result value storage unit 41a. An error log supplied from the test instruction executing function unit 37a is stored in the error storage unit 42a.

The test instruction sequence is produced by the test instruction producing function unit 33a and stored in the main storage device 11a. The condition code obtaining function unit 34a and the condition branching instruction adding function unit 36a change the test instruction sequence produced by the test instruction producing function unit 33a to a test instruction sequence executed by the test instruction executing function unit 37a.

A processor test program 30a is a program in which each of the functions defined by the above function units (control function unit 31a to the error processing function unit 39a) are written in the programming language. The processor 12a executes the processor test program 30a to perform each of the functions of the above functions (control function unit 31a to the error processing function unit 39a).

The control function unit 31a has a control function of controlling execution of each of the above function units (random number generating function unit 32a to the error processing function unit 39a) or sharing events of each of the function units. The control function of the control function unit 31a is the function that is initially performed after the processor test program 30a is executed.

The random number generating function unit 32a has a function of producing a random number using an algorithm produce a pseudo random number. The test instruction producing function unit 33a has a function of producing a randomly-produced test instruction based on the random number generated by the random number generating function unit 32a. When the control function unit 31a confirms that the random number generating function unit 32a supplies a random number, the control function unit 31a delivers, to the test instruction producing function unit 33a, the supplied random number to the test instruction producing function unit 33a in order to produce the test instruction. Based on the random number generated by the random number generating function unit 32a, the test instruction producing function unit 33a selects a processor testing test instruction from a test instruction table and an operand from an operand table. The test instruction producing function unit 33a stores the selected test instruction in the main storage device 11a.

Figure 3:
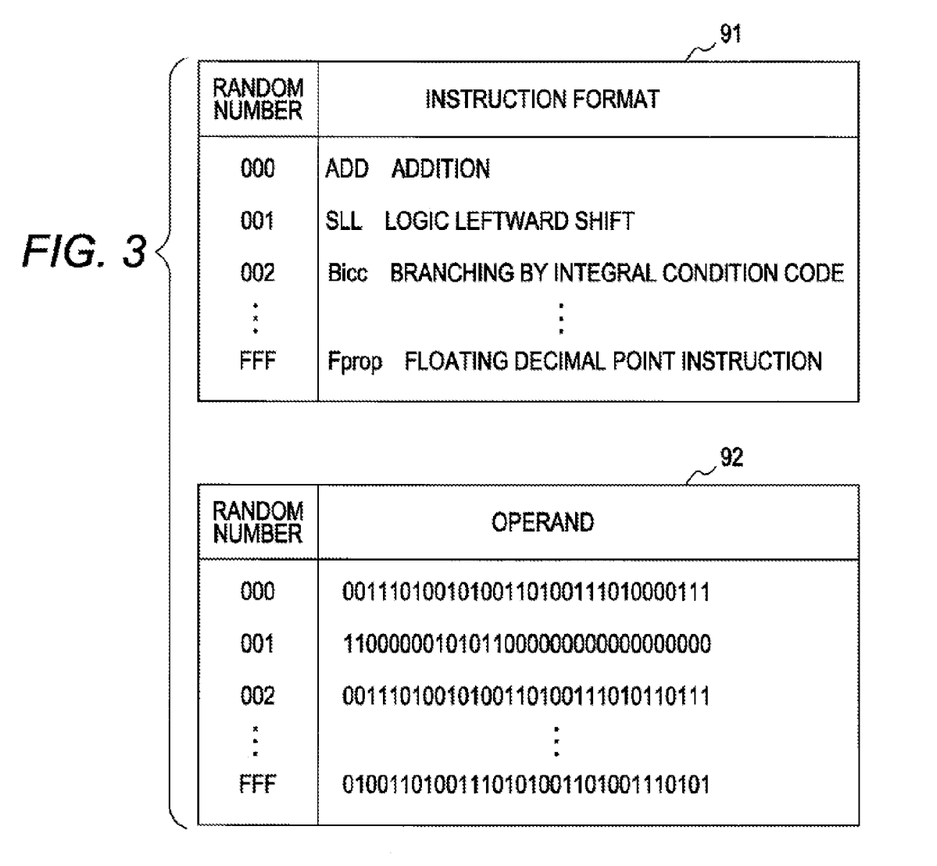
FIG. 3 illustrates a test instruction table and an operand table of the first embodiment.

The test instruction table and operand table, which are used to produce the test instruction based on the random number, will be described with reference to FIG. 3. A test instruction table 91 of FIG. 3 is a table in which the random number and an instruction format are correlated with each other. An operand table 92 is a table in which the random number and an operand are correlated with each other. Examples of the operand include a numeric character, a character, and a floating decimal point. The test instruction table 91 and the operand table 92 are stored in the main storage device 11a.

When the random number generated by the random number generating function unit 32a may be defined by a six-digit octet value, the test instruction producing function unit 33a selects the instruction format from the test instruction table 91 using upper-three-digit octet values of the random number, and the test instruction producing function unit 33a selects the operand from the operand table 92 using lower-three-digit octet values of the random number.

In FIG. 3, the test instruction and the operand are defined by separate tables. Alternatively, the test instruction and the operand may be defined by one table, and a set of the test instruction and the operand may be selected by the random number.

The test instruction producing function unit 33a produces a specific number of test instructions that are selected using the random number. The number of instructions of the test instruction sequence is determined by a processor testing method. For example, the number of instructions may be defined in a range of 100 to 10,000. The number of instructions may be defined as a program variable in the processor test program 30a through the input device 22a. The test instruction producing function unit 33a stores the test instruction, selected using the random number, in the main storage device 11a.

The condition code obtaining function unit 34a has a function of executing one test instruction of a processor testing test instruction sequence at a time to obtain a condition code set by a condition code setting instruction of the test instruction sequence. The condition code obtaining function unit 34a includes an interruption instruction adding function unit 35a. The interruption instruction adding function unit 35a has a function of distinguishing condition code setting instructions of the test instruction sequence from one another to add an interruption instruction. The interruption instruction is an instruction subsequent to the distinguished condition code setting instruction, and the interruption instruction obtains the condition code. The condition code obtaining function unit 34a executes the added interruption instruction to obtain the condition code set by the condition code setting instruction of the test instruction sequence.

When the control function unit 31a confirms that the test instruction producing function unit 33a produces the test instruction, the control function unit 31a delivers the produced test instruction to the condition code obtaining function unit 34a in order to cause the condition code obtaining function unit 34a to obtain the condition code from the test instruction sequence.

The condition code obtaining function unit 34a and the interruption instruction adding function unit 35a may execute the produced test instruction one by one each time the test instruction producing function unit 33a produces the test instruction.

The test instruction producing function unit 33a detects the condition code setting instruction in the test instruction sequence which is created by the test instruction producing function unit 33a and stored in the main storage unit 11a. The test instruction producing function unit 33a then adds the interruption instruction as a subsequent instruction of the detected condition code setting instruction. The added interruption instruction is one that supplies a value set by the condition code setting instruction set prior to the interruption instruction, for example one of values −1, 0, and 1 as an output code.

When the target test instruction is the end of the test instruction sequence, the interruption instruction adding function unit 35a adds a final interruption instruction to the end of the test instruction sequence. The final interruption instruction stores the output value of the final test instruction as an expected value in the expected value storage unit 40a.

The condition code that is operated and supplied by the condition code obtaining function unit 34a is data compared to the condition code that the test instruction executing function unit 37a obtains using the advanced control scheme. Therefore, preferably a high-accuracy operation scheme of executing one test instruction of the test instruction sequence at a time is adopted as the condition code obtained by the condition code obtaining function unit 34a. Examples of the high-accuracy operation scheme include an instruction simulation or a sequential control scheme.

The instruction simulation is a scheme in which the operation of the test instruction sequence by the processor 12a is correctly simulated in each test instruction. Part of the processor test program 30a includes a program for defining an instruction simulation function. The processor 12a executes the program, whereby the condition code obtaining function unit 34a performs the instruction simulation.

In the register 12a-2 of the processor 12a, a flag is set in a control register that switches between advanced control and sequential control, and an operation scheme of the processor is changed to realize the sequential control scheme. When the flag is set in the control register, the condition code obtaining function unit 34a operates the test instruction not by the advanced control scheme but by the sequential operation scheme. The condition code obtaining function unit 34a executes the test instruction of the test instruction sequence one by one by the operation of the instruction simulation or the operation of the sequential operation scheme, so that the condition code obtaining function unit 34a obtains the condition code without trouble with the advanced control scheme.

The condition branching instruction adding function unit 36a has a function of obtaining the condition code that is an output of the interruption instruction by the condition code obtaining function unit 34a, and of producing a condition branching instruction. The condition branching instruction conducts branching when the condition code does not hold. The condition branching instruction adding function unit 36a also has a function of replacing a condition branching instruction that is produced instead of the interruption instruction in the test instruction sequence.

When the control function unit 31a confirms that the condition code obtaining function unit 34a executes the test instruction, the control function unit 31a delivers the executed test instruction to the condition branching instruction adding function unit 36a in order to cause the condition branching instruction adding function unit 36a to replace the interruption instruction with the condition branching instruction.

For example, when the condition code obtaining function unit 34a supplies the interruption instruction of "−1" in the condition codes of −1, 0, and 1, the condition branching instruction adding function unit 36a determines that the condition code of "−1" is the condition code when the condition holds true. On the other hand, the condition branching instruction adding function unit 36a determines that the condition code of "0" or "1" are the condition code when the condition does not hold. The condition branching instruction adding function unit 36a produces a condition branching instruction for conducting the branching to an error output instruction when the condition code is "0" or "1". The condition branching instruction adding function unit 36a then replaces the interruption instruction with the produced condition branching instruction in the test instruction sequence.

The error output instruction includes a direction for supplying the error log to the error storage unit 42a. The error log is information for identifying the condition code setting instruction supplying the condition code that does not match the condition code obtained by the condition code obtaining function unit 34a. The error log may include the condition code when the condition does not hold, the interruption instruction in which the condition branching instruction adding function unit 36a determined that the condition does not hold, and a time stamp when the condition branching instruction is executed. The error output instruction is stored in a region of the main storage device 11a. The condition branching instruction may be an instruction specifying an address of the region in which the error output instruction is stored.

The test instruction executing function unit 37a has a function of executing the test instruction sequence using the advanced control scheme of the processor 12a that is the test target. When the control function unit 31a confirms that a specific number of test instruction sequences are produced, the control function unit 31a causes the test instruction executing function unit 37a to execute the test instruction sequence. As described above, the test instruction sequence executed by the test instruction executing function unit 37a is a sequence to which the condition branching instruction adding function unit 36a adds the condition branching instruction. The test instruction executing function unit 37a executes the error output instruction branched by the condition branching instruction when the condition code setting instruction is incorrectly executed.

The test instruction executing function unit 37a stores the result value in the result value storage unit 41a when the final test instruction of the test instruction sequence is operated.

When the control function unit 31a confirms that the test instruction executing function unit 37a stores the result value in the result value storage unit 41a, the control function unit 31a causes the result comparing function unit 38a to obtain the expected value and the result value in order to cause the result comparing function unit 38a to compare the expected value and the result value. When the result comparing function unit 38a obtains the result value from the result value storage unit 41a, the result comparing function unit 38a obtains the expected value from the expected value storage unit 40a to determine whether the expected value and the result value match each other. When the expected value and the result value match each other, the result comparing function unit 38a supplies a result indicating that the advanced control scheme performed by the processor 12a correctly executes the condition code setting instruction to the output device 23a. When the expected value and the result value do not match each other, the result comparing function unit 38a notifies the error processing function unit 39a of the mismatch.

When the error processing function unit 39a receives the mismatch notification from the result comparing function unit 38a, the error processing function unit 39a performs processing for supplying one or more error logs stored in the error storage unit 42a to the output device 23a.

Figure 4:
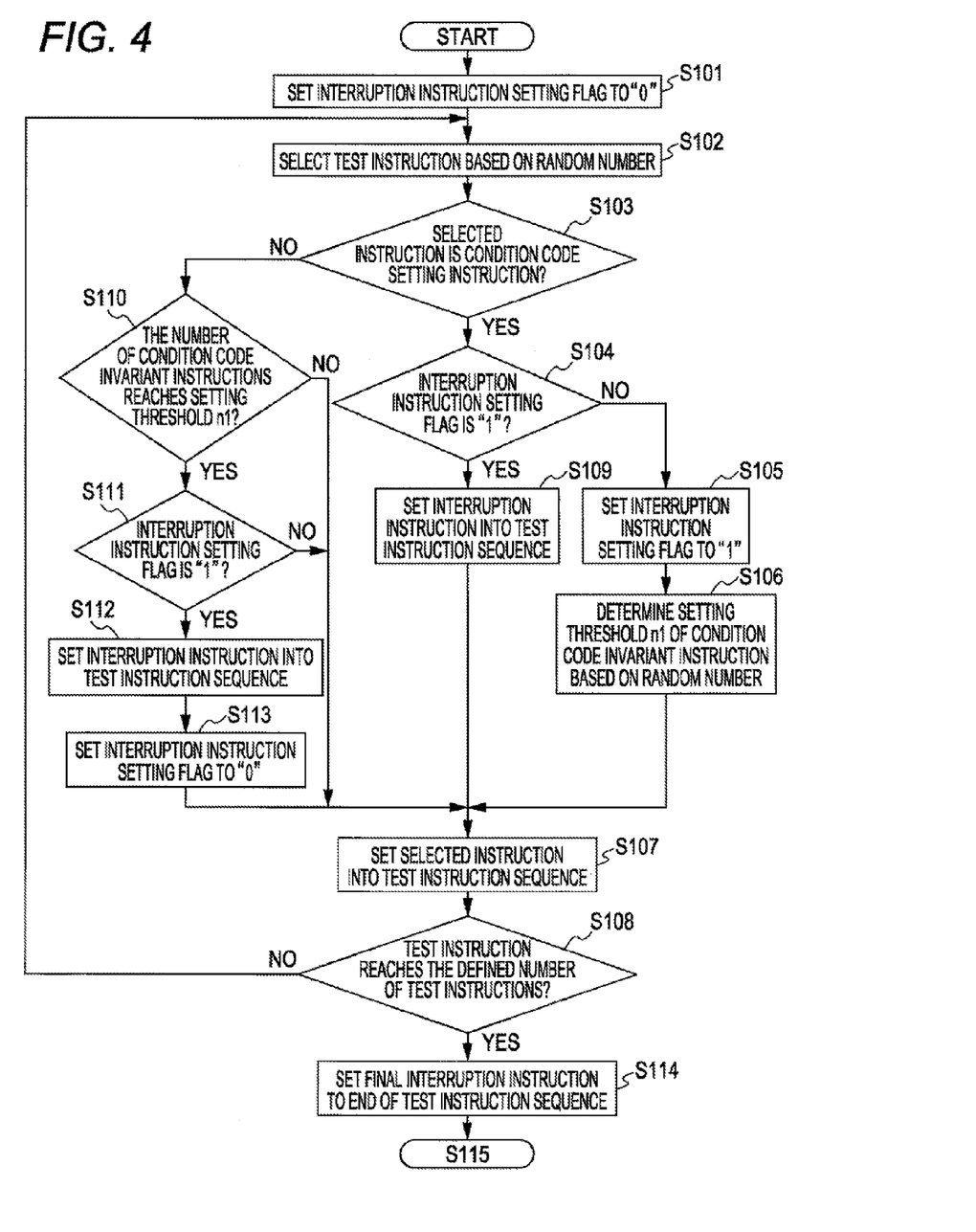
FIG. 4 illustrates a test instruction sequence producing processing flow performed by the processor test apparatus of the first embodiment.
Figure 5:
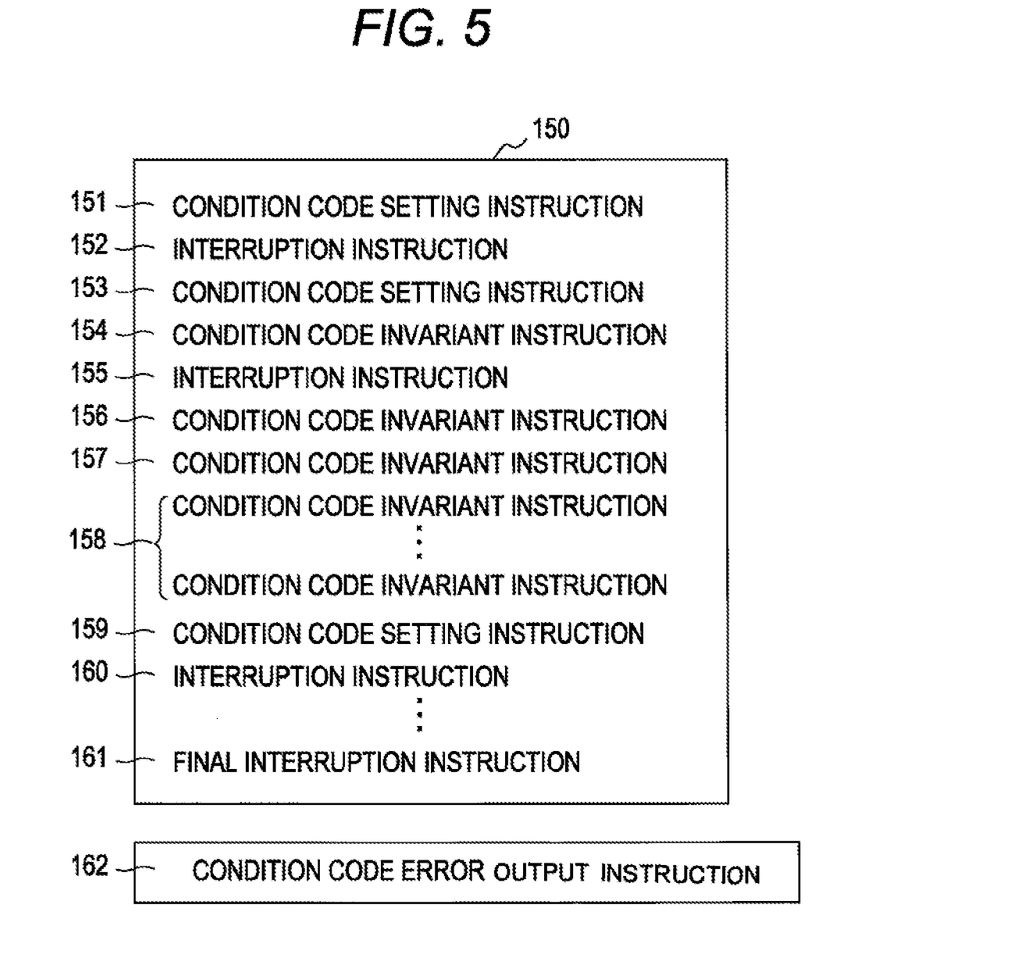
FIG. 5 illustrates a test instruction sequence produced by the test instruction sequence producing processing flow of the first embodiment.
Figure 6:
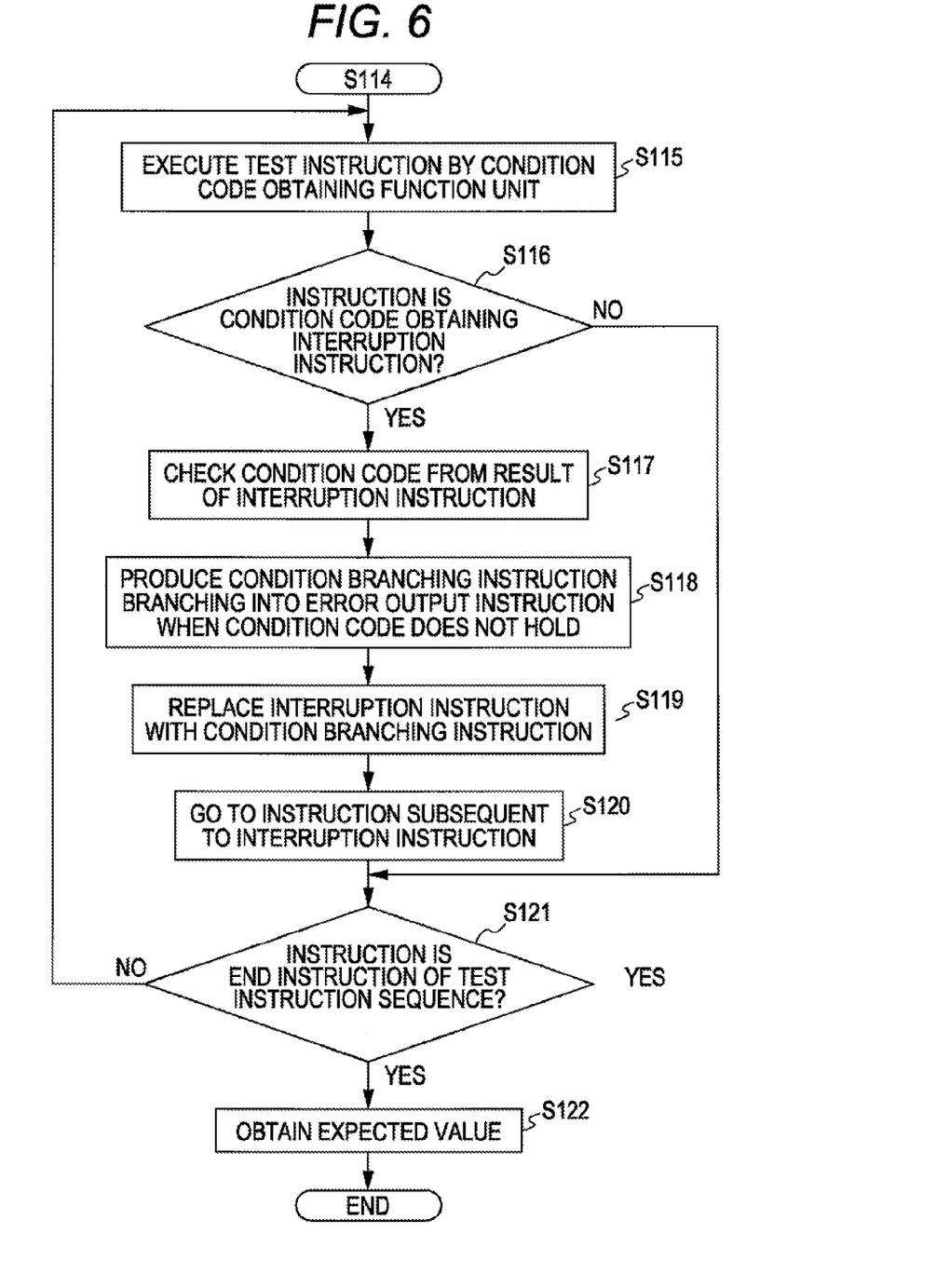
FIG. 6 illustrates a test instruction sequence producing processing flow performed by the processor test apparatus of the first embodiment.
Figure 7:
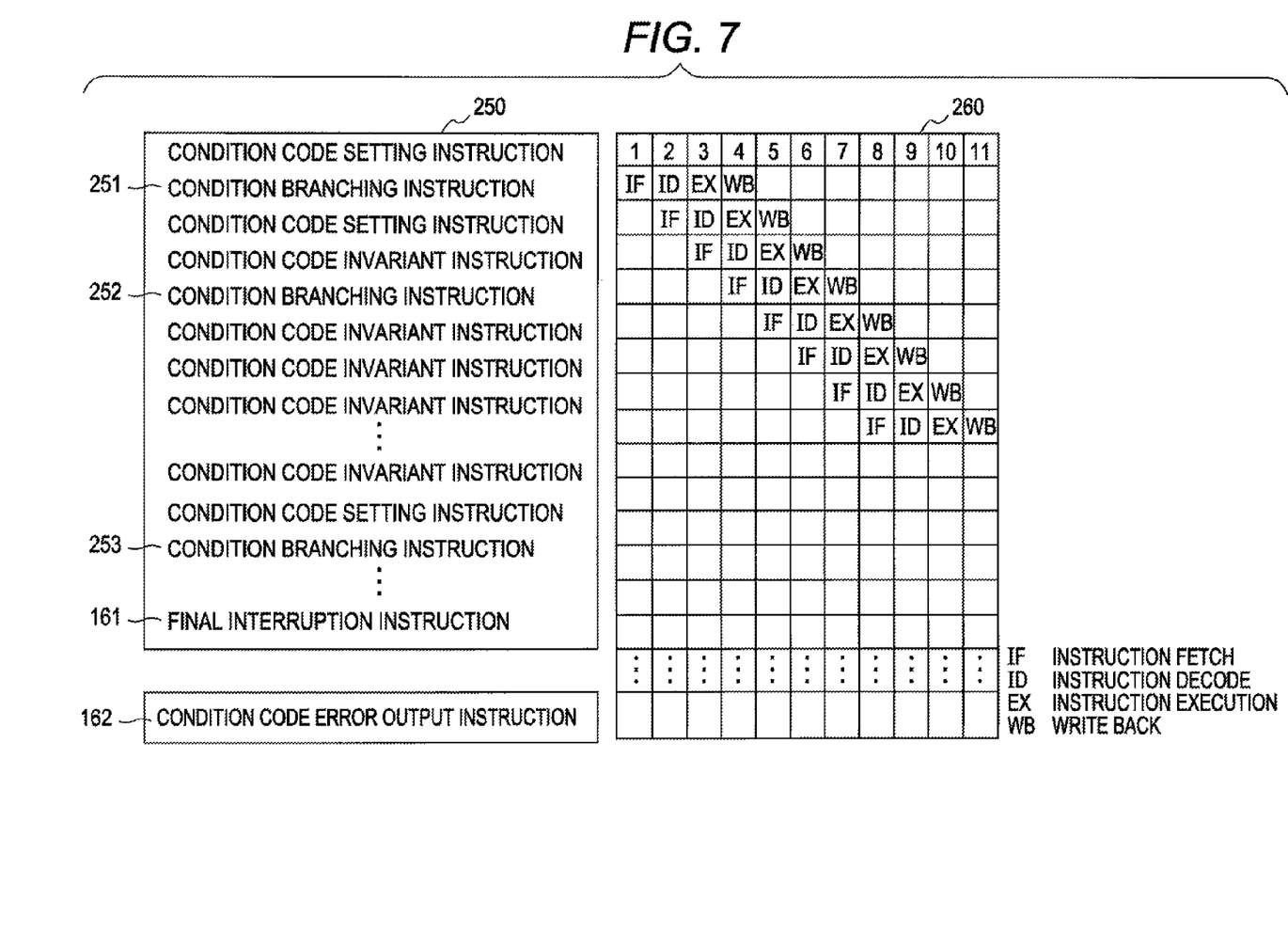
FIG. 7 illustrates a test instruction sequence produced by the test instruction sequence producing processing flow of the first embodiment.

A test instruction sequence producing processing flow performed by the processor test apparatus of the first embodiment will be described with reference to FIGS. 4 to 7. FIGS. 4 and 6 illustrate the test instruction sequence producing processing flow performed by the processor test apparatus. FIG. 5 illustrates a test instruction sequence 150 produced by the test instruction sequence producing processing flow of FIG. 4 and stored in the main storage device 11a. FIG. 7 illustrates a test instruction sequence 250 that is produced by the test instruction sequence producing processing flow of FIG. 6 and stored in the main storage device 11a.

The processing flow of FIG. 4 includes five condition branching operations S103, S104, S108, S110, and S111. A loop of the condition branching operation S103, S104, S108, S110, and S111 is formed by the condition branching operation S108. The processing flow has the following processing combinations due to the pieces of condition branching processing:

condition code setting instruction processing flow 1: YES in S103, NO in S104, and NO in S108,
condition code setting instruction processing flow 2: YES in S103, YES in S104, and NO in S108,
condition code invariant instruction processing flow 1: NO in S103, NO in S110, and NO in S108,
condition code invariant instruction processing flow 2: NO in S103, YES in S110, YES in S111, and NO in S108, and
condition code invariant instruction processing flow 3: NO in S103, YES in S110, NO in S111, and NO in S108.

The five processing flows will be described below with reference to FIGS. 4 and 5. The processor 12a executes the processor test program 30a to enable the function units 31a to 39a to be operated. The control function unit 31a provides the execution direction to the function unit that takes charge of the processing in order to manage execution timing of each function unit in the test instruction sequence producing processing flow. In the following description, the description that the control function unit 31a provides the processing direction to each function unit is omitted in order to avoid redundancy.

(Condition Code Setting Instruction Processing Flow 1: YES in S103, NO in S104, and NO in S108)

The test instruction producing function unit 33a sets the interruption instruction setting flag provided in the main storage device 11a to "0" (S101). The test instruction producing function unit 33a selects the test instruction based on the random number produced by the random number generating function unit 32a (S102). The test instruction producing function unit 33a selects the test instruction from the test instruction table 91 according to the random number. The test instruction producing function unit 33a stores the selected test instruction in the main storage device 11a.

The interruption instruction adding function unit 35a determines whether the selected test instruction is the condition code setting instruction (S103).

When the selected test instruction is the condition code setting instruction (YES in S103), the interruption instruction adding function unit 35a determines whether the interruption setting instruction flag is set to "1". In the case of the condition code setting instruction processing flow 1, because the interruption setting instruction flag is set to "0" in S101 (NO in S104), the interruption instruction adding function unit 35a sets the interruption setting instruction flag to "1" (S105).

The interruption instruction adding function unit 35a then determines a setting threshold n1 of the condition code invariant instruction based on the random number (S106). The setting threshold n1 is an integral variable. For example, it is assumed that the setting threshold n1 is set to "2" by the random number. The interruption instruction adding function unit 35a stores the setting threshold n1 in the main storage device 11a. As illustrated by a condition code setting instruction 151 of FIG. 5, the interruption instruction adding function unit 35a sets the selected instruction to the test instruction sequence 150 (S107). The test instruction producing function unit 33a determines whether the test instruction of the test instruction sequence 150 reaches the defined number of test instructions (S108). The test instruction producing function unit 33a returns to S102 when the test instruction of the test instruction sequence 150 does not reach the defined number of test instructions (NO in S108).

The setting threshold n1 of the condition code invariant instruction is a setting value that disposes the condition branching instruction, with which the interruption instruction is replaced, not as an instruction immediately after the condition code setting instruction, but as an instruction farther behind the condition code setting instruction. The condition branching instruction may be disposed not immediately after the condition code setting instruction but farther away from the condition code setting instruction in the test instruction sequence due to a larger setting threshold n1.

(Condition Code Setting Instruction Processing Flow 2: YES in S103, YES in S104, and NO in S108)

The test instruction producing function unit 33a selects the test instruction based on the random number produced by the random number generating function unit 32a (S102). When the selected instruction is the condition code setting instruction (YES in S103), the interruption instruction adding function unit 35a determines whether the interruption setting instruction flag is set to "1". In the case of the condition code setting instruction processing flow 2, because the interruption setting instruction flag is set to "1" in S105 of the condition code setting instruction processing flow 1 (YES in S104), the interruption instruction adding function unit 35a sets the interruption instruction to the test instruction sequence 150 as indicated in the line 152 of FIG. 5 (S109). As indicated in the condition code setting instruction 153 of FIG. 5, the interruption instruction adding function unit 35a sets the instruction selected in S102 to the test instruction sequence 150 (S107). The test instruction producing function unit 33a then determines whether the test instruction of the test instruction sequence 150 reaches the defined number of test instructions (S108). When the test instruction of the test instruction sequence 150 does not reach the defined number of test instructions (NO in S108), the test instruction producing function unit 33a performs the processing in S102.

(Condition Code Invariant Instruction Processing Flow 1: NO in S103, NO in S110, and NO in S108)

The test instruction producing function unit 33a selects the test instruction based on the random number produced by the random number generating function unit 32a (S102). When the selected instruction is not the condition code setting instruction (NO in S103), the interruption instruction adding function unit 35a determines whether the number of condition code invariant instructions reaches the setting threshold n1 (S110). The condition code invariant instruction has the setting threshold n1 of "2" that is set in S106. The number of condition code invariant instructions is "1". Therefore, because the number of condition code invariant instructions does not reach the setting threshold n1 (NO in S110), the interruption instruction adding function unit 35a sets the instruction selected in S102 to the test instruction sequence 150 as indicated by an interruption instruction 155 of FIG. 5 (S107). When the test instruction of the test instruction sequence 150 does not reach the defined number of test instructions (NO in S108), the test instruction producing function unit 33a performs the processing in S102.

(Condition Code Invariant Instruction Processing Flow 2: NO in S103, YES in S110, YES in S111, and NO in S108)

The test instruction producing function unit 33a selects the test instruction based on the random number produced by the random number generating function unit 32a (S102). When the selected instruction is not the condition code setting instruction (NO in S103), the interruption instruction adding function unit 35a determines whether the number of condition code invariant instructions reaches the setting threshold n1 (S110). The condition code invariant instruction has the setting threshold n1 of "2" that is set in S106 of the condition code invariant instruction processing flow 1. The number of condition code invariant instructions is "2". Because the number of condition code invariant instructions reaches the setting threshold n1 (YES in S110), the interruption instruction adding function unit 35a determines whether or not the interruption instruction setting flag is set to "1" (S111). In this case, number of condition code invariant instructions reaches the setting threshold n1, so that the number of condition code invariant instructions is reset to "0". Because the interruption instruction setting flag remains set to "1" in S105 of the condition code setting instruction processing flow 1 (YES in S111), the interruption instruction adding function unit 35a sets the interruption instruction to the test instruction sequence 150 as illustrated by an interruption instruction 155 of FIG. 5 (S112).

The interruption instruction adding function unit 35a then sets the interruption instruction setting flag to "0" (S113). As illustrated by a condition code invariant instruction 156 of FIG. 5, the interruption instruction adding function unit 35a sets the condition code invariant instruction selected in S102 to the test instruction sequence 150 (S107). When the test instruction of the test instruction sequence 150 does not reach the defined number of test instructions (NO in S108), the test instruction producing function unit 33a performs the processing in S102.

(Condition Code Invariant Instruction Processing Flow 3: NO in S103, YES in S110, NO in S111, and NO in S108)

The test instruction producing function unit 33a selects the test instruction based on the random number produced by the random number generating function unit 32a (S102). When the selected instruction is not the condition code setting instruction (NO in S103), the interruption instruction adding function unit 35a sets the number of condition code invariant instructions to the main storage device 11a. In this case, the number of condition code invariant instructions is set to "2".

The interruption instruction adding function unit 35a then determines whether the number of condition code invariant instructions reaches the setting threshold n1 (S110). The condition code invariant instruction has the setting threshold n1 of "2" that is set in S106 of the condition code setting instruction processing flow 1. Because the number of condition code invariant instructions reaches the setting threshold n1 (YES in S110), the interruption instruction adding function unit 35a determines whether or not the interruption instruction setting flag is set to "1" (S112). Because the interruption instruction setting flag remains set to "0" in S113 of the condition code invariant instruction processing flow 2 (NO in S111), the interruption instruction adding function unit 35a sets the condition code invariant instruction selected in S102 to the test instruction sequence 150 as illustrated by a condition code invariant instruction 157 of FIG. 5 (S107). When the test instruction of the test instruction sequence 150 does not reach the defined number of test instructions (NO in S108), the test instruction producing function unit 33a performs the processing in S102.

As long as the test instruction producing function unit 33a does not select the condition code setting instruction based on the random number produced by the random number generating function unit 32a in S102, the "condition code invariant instruction processing flow 3" is repeatedly performed, and the condition code invariant instruction is repeatedly written in the test instruction sequence 150 as illustrated by the line 158 of FIG. 5.

On the other hand, when the test instruction producing function unit 33a selects the condition code setting instruction based on the random number produced by the random number generating function unit 32a in S102, the "condition code setting instruction processing flow 1" is performed again, the "condition code setting instruction processing flow 1" is repeatedly performed, and a condition code setting instruction 159 and an interruption instruction 160 are set to the test instruction sequence 150 as illustrated in FIG. 5. As illustrated in FIG. 5, a final interruption instruction 161 is set to the end of the test instruction sequence 150.

A condition code error output instruction 162 is stored in a region defined by a specific memory address of the main storage device 11a.

As described above, when the test instruction of the test instruction sequence 150 reaches the defined number of test instructions by performing one of the processing flows 1 to 5 (YES in S108), the condition code obtaining function unit 34a sets the final interruption instruction to the end of the test instruction sequence 150 (S114), and the condition code obtaining function unit 34a goes to S115 of FIG. 6.

In S115 of FIG. 6, the condition code obtaining function unit 34a performs the test instruction sequence 150 of the FIG. 5 one by one in the ascending order (S115). The condition branching instruction adding function unit 36a determines whether the instruction of the test instruction sequence 150 is the interruption instruction taking the condition code one by one in the ascending order (S116). When the instruction of the determination target is the condition code obtaining interruption instruction (YES in S116), the condition branching instruction adding function unit 36a checks the condition code from the result of the interruption instruction executed by the condition code obtaining function unit 34a (S117). When the instruction of the determination target is not the condition code obtaining interruption instruction (NO in S116), the condition branching instruction adding function unit 36a goes to S121.

The condition branching instruction adding function unit 36a checks the condition code from the result of the interruption instruction executed by the condition code obtaining function unit 34a (S117). Then the condition branching instruction adding function unit 36a produces the condition branching instruction (S118). The condition branching instruction branches to the condition code error output instruction when the condition code does not hold. For example, in cases where the condition code obtained in S116 is "0", the condition branching instruction adding function unit 36a produces the condition branching instruction that branches to the condition code error output instruction when the condition code is "−1" or "1".

The condition branching instruction adding function unit 36a replaces the interruption instruction that is the determination target in S115 with the condition branching instruction (S119). The processing in S119 is performed such that the condition branching instruction adding function unit 36a overwrites the interruption instruction that becomes the target stored in the main storage device 11a using the condition branching instruction. The condition branching instruction adding function unit 36a goes to the instruction subsequent to the interruption instruction that is the determination target in S116 (S120).

The condition branching instruction adding function unit 36a determines whether the instruction that is the determination target in S116 is the end instruction of the test instruction sequence (S121). When the instruction that is the determination target in S116 is not the end instruction of the test instruction sequence (NO in S121), the condition code obtaining function unit 34a executes the next instruction (S115). On the other hand, when the instruction that is the determination target in S116 is the end instruction of the test instruction sequence (YES in S121), the condition code obtaining function unit 34a executes the final interruption instruction to obtain the expected value that is the output of the final interruption instruction (S122), and the condition code obtaining function unit 34a stores the expected value in the expected value storage unit 40a. Thus, the control function unit 31a ends the test instruction sequence producing processing flow.

FIG. 7 illustrates a test instruction sequence 250 stored in the main storage device 11a after the interruption instruction of the test instruction sequence 150 is replaced with the condition branching instruction. In the test instruction sequence 250 of FIG. 7, the interruption instructions 152, 155, and 160 of the test instruction sequence 150 of FIG. 5 are replaced with condition branching instructions 251, 252, and 253, respectively.

Figure 8:
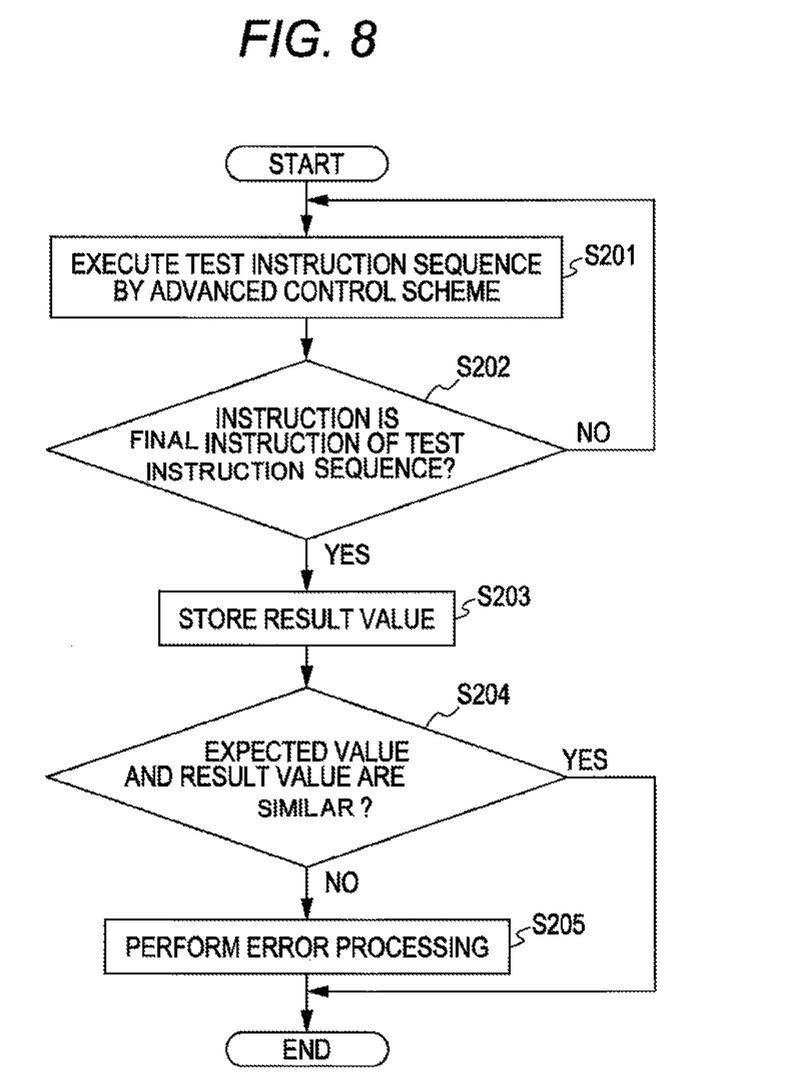
FIG. 8 illustrates a test instruction sequence executing processing flow performed by the processor test apparatus of the first embodiment.

A test instruction sequence executing processing flow performed by the processor test apparatus of the first embodiment will be described with reference to FIG. 8.

Under the direction of the control function unit 31a, the test instruction executing function unit 37a executes the test instruction sequence 250 by the advanced control scheme (S201). When the executed instruction is not the final instruction of the test instruction sequence 250 (NO in S202), the test instruction executing function unit 37a executes the test instruction sequence 250 by the advanced control scheme (S201).

The test instruction executing function unit 37a determines whether the instruction is the final instruction based on whether the interruption instruction is the final interruption instruction or not. When the executed instruction is the final instruction of the test instruction sequence 250 (YES in S202), the test instruction executing function unit 37a executes the final interruption instruction that is the final instruction, and the test instruction executing function unit 37a stores the result value that is the output value of the test instruction sequence 250 in the result value storage unit 41a (S203).

When the result comparing function unit 38a confirms that the result value is stored in the result value storage unit 41a, the result comparing function unit 38a determines whether the expected value stored in the expected value storage unit 40a is equal to the result value stored in the result value storage unit 41a (S204). When the expected value is not equal to the result value (NO in S204), the error processing function unit 39a performs error processing (S205).

In the error processing, the error log stored in the error storage unit 42a is obtained and supplied to the output device 23a. In executing the test instruction sequence 250 by the advanced control scheme (S201), the determination that the condition code does not hold is made by the condition branching instruction, and the error log is stored in the error storage unit 42a by executing the condition code error output instruction 162 that is the branching destination.

On the other hand, when the expected value is equal to the result value (YES in S204), the error processing function unit 39a notifies the output device 23a that the advanced control is performed normally, and the control function unit 31a ends the instruction test sequence executing processing flow of the processor test.

FIG. 7 illustrates a time cycle 260 of the instruction execution. The letters "IF" designate an instruction fetch that is processing performed by the processor 12a, the letters "ID" designate instruction decode from the register or cache memory, the letters "EX" designate instruction execution, and the letters "WB" designate write back to the register or cache memory.

In executing the test instruction sequence 250 by the advanced control scheme (S201), when the determination that the condition code holds true is made by the condition branching instruction, the branching instruction to the error output instruction is not executed in the condition branching instruction as illustrated by the time cycle 260 of FIG. 7. Therefore, the test instruction executing function unit 37a may effectively perform the advanced control function to execute the test instruction sequence 250.

As described above, the condition code cannot be specified in the random test instruction sequence produced by the test instruction producing function unit 33a. However, the condition code obtaining function unit 34a executes the interruption instruction to obtain the condition code, and the condition branching instruction indicating whether or not the condition code holds true is additionally written in the test instruction sequence using the obtained condition code, whereby the test instruction sequence that is able to determine whether the condition code holds true may be produced. Therefore, in the processor test apparatus and processor test method of the first embodiment, the test instruction executing function unit 37a may execute the test instruction sequence 250 to determine whether the condition code holds true for all the condition code setting instructions included in the test instruction sequence 250.

The branching instruction performing the comparison processing of the result value and the expected value is not performed for each of the condition code setting instructions, but the condition branching instruction is executed by the advanced control scheme to confirm the branching instruction determining whether or not the condition code holds true, so that the condition code may be confirmed without interrupting the advanced control. Therefore, in the processor test apparatus and processor test method of the first embodiment, all the condition code setting instructions may be tested without interrupting the advanced control. Further, in the processor test apparatus and processor test method of the first embodiment, the branching instruction determining whether or not the condition code holds true is eliminated for each condition code setting instruction. Therefore, the test instruction sequence approximating the usage of the actual processor may be produced to reduce an unnecessary load on the test target processor, which is caused by the condition code confirming processing.

In the conventional test, in order to exert the maximum capacity of the advanced control scheme, the branching success instruction is operated, after the subsequent branching failure instruction is operated in advance until the stage at which the condition code of the conditional branching instruction is set. However, in the processor test apparatus and processor test method of the first embodiment, the processing for confirming the condition code setting instruction that is produced based on the test instruction produced based on the random number may be executed without providing the two instructions, that is, the branching failure instruction and the branching success instruction after the condition code setting instruction. Therefore, in the processor test apparatus and processor test method of the first embodiment, the advanced control function of the processor may be tested by the test instruction approximating the instruction executed by the actual processor.

Using the setting threshold of the condition code invariant instruction, the condition branching instruction may be disposed as not the instruction immediately after the condition code setting instruction but the instruction further behind the condition code setting instruction. Therefore, in the processor test apparatus and processor test method of the first embodiment, the test instruction may be produced while a difference with the actual instruction, caused by the addition of the condition branching instruction to the condition code setting instruction, is reduced.

The error output instruction of the branching destination of the condition branching instruction is a simple instruction that outputs the error log related to the condition code setting instruction. Therefore, even if the error output instruction does not match the condition code, the time the advanced control function is interrupted by executing the error output instruction is shortened to reduce the unnecessary load on the test target processor, which is caused by the condition code confirming processing. Even if the error output instruction does not match the condition code, in the processor test apparatus and processor test method of the first embodiment, the advanced control function of the processor may be tested by the test instruction close to the instruction executed by the actual processor.

A hardware configuration of a processor test apparatus according to a second embodiment of the invention will be described below with reference to FIG. 9. In FIG. 1, the processor 12a that is the test target is incorporated in the processor test apparatus 20a. On the other hand, in FIG. 9, a processor 12c that is the test target is disposed outside the processor test apparatus 20b and connected to the bus interface unit 13b. The processor test apparatus 20b is used as the apparatus dedicated to the test, and the processor test may be performed while the processor 12c that is the test target is attached externally.

The processor test apparatus 20b includes a main storage device 11b, a processor 12b, a bus interface unit 13b, an auxiliary storage device 14b, a disk interface 15b, an input device 22b, and an output device 23b. The hardware configurations 11 to 15b, 22b, and 23b correspond to the hardware configurations 11 to 15a, 22a, and 23a of FIG. 1, respectively. The description of the hardware configuration of the processor test apparatus 20b is omitted, because each of the hardware configurations 11 to 15b, 22b, and 23b has the same function as the corresponding hardware configuration.

The processor test apparatus 20b has the same hardware configuration as the processor test apparatus 20a of FIG. 1 except that the processor test apparatus 20b is connected to the processor 12c that is the test target through the bus interface unit 13b.

Figure 10:
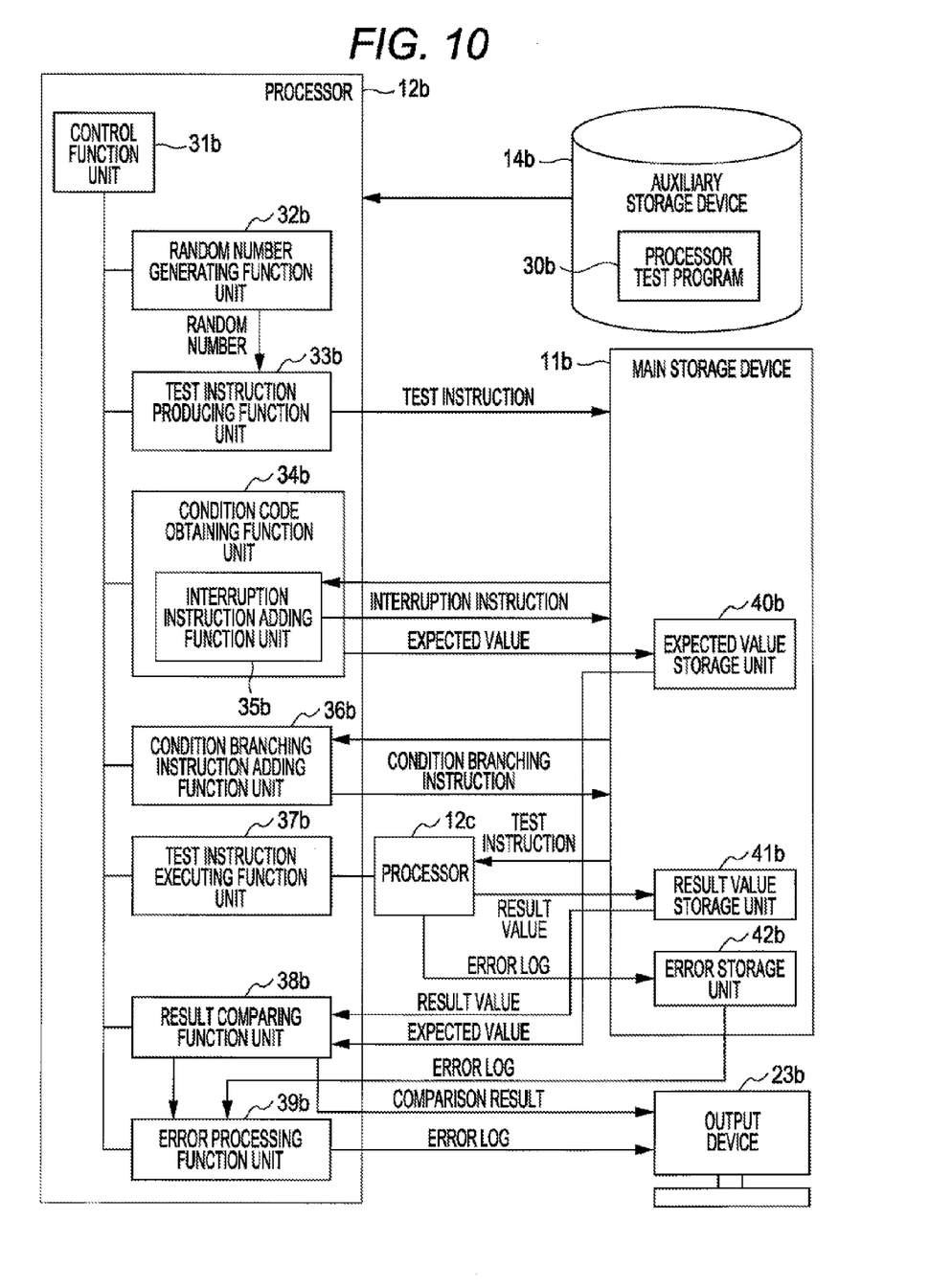
FIG. 10 illustrates a functional configuration implemented by the processor test apparatus of the second embodiment.

FIG. 10 illustrates an example of a functional configuration implemented by the processor test apparatus of the second embodiment.

In a processor test program 30b stored in the auxiliary storage device 14b, each of the functions corresponding to a control function unit 31b to an error processing function unit 39b are written in a programming language. The processor 12b may execute the processor test program 30b to realize the functions of the control function unit 31b to the error processing function unit 39b.

Figure 2:
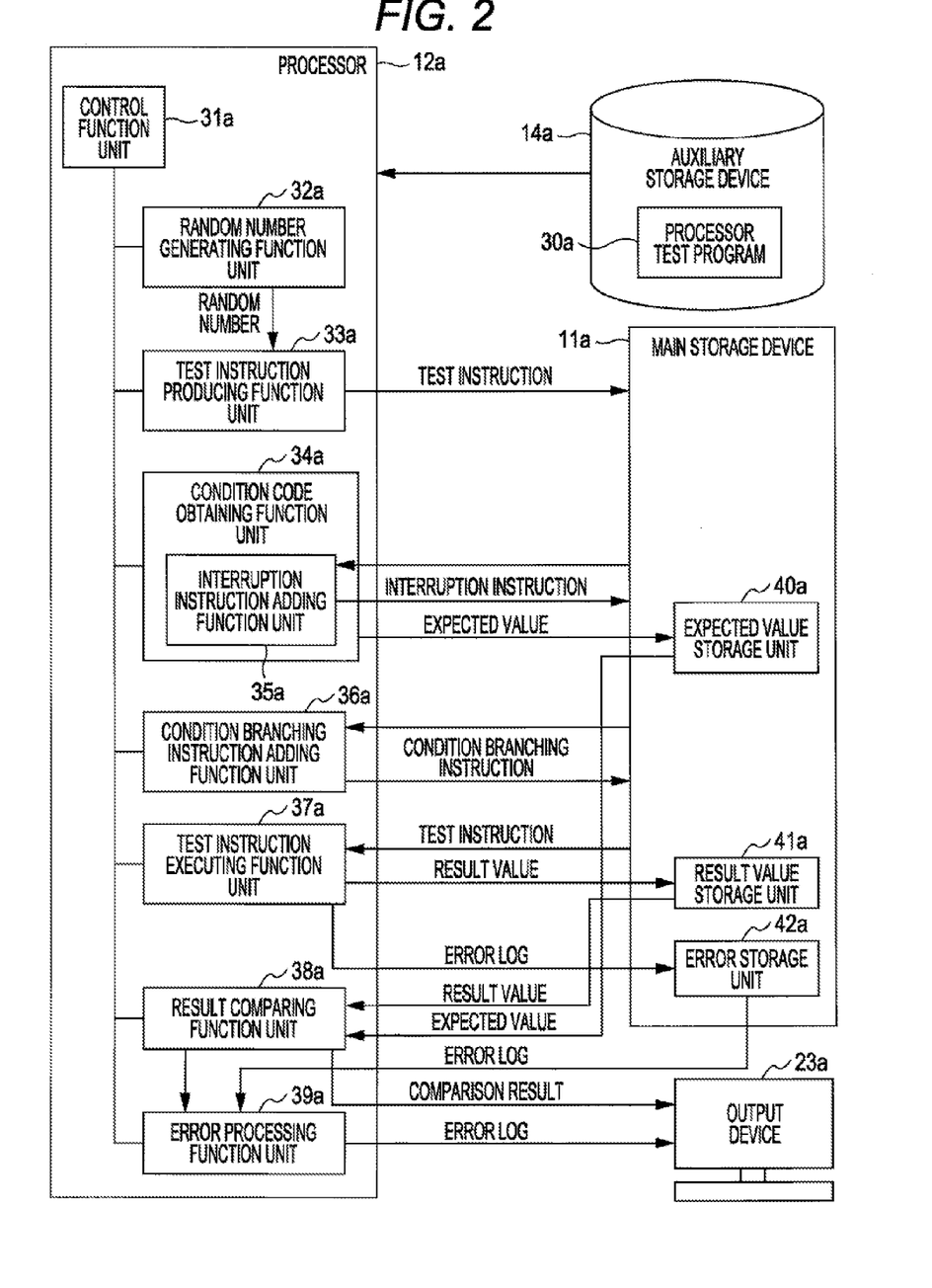
FIG. 2 illustrates a functional configuration of the processor test apparatus of the first embodiment.

The function units 31b to 36b, 38b, and 39b implemented by the processor test apparatus 20b correspond to the function units 31a to 36a, 38a, and 39a of FIG. 2, respectively. The description of the functional configuration of the processor test apparatus 20b is omitted except for the description of the test instruction executing function unit 37b, because the function units 31b to 36b, 38b, and 39b have the same functions as the functional units 31a to 36a, 38a, and 39a of FIG. 2.

The test instruction executing function unit 37b has a function of executing a test instruction sequence 250 using the advanced control scheme of the processor 12c. The processor 12c that is the test target is externally connected to the processor test apparatus 20b. When the control function unit 31b confirms that a specific number of test instruction sequences 250 are produced, the control function unit 31b activates the test instruction executing function unit 37b.

Under the execution direction of the test instruction executing function unit 37b, the processor 12c executes the test instruction sequence 250 stored in the main storage device 11b. If the condition code setting instruction is incorrectly performed, the processor 12c executes the error output instruction that branches by the condition branching instruction. The error output instruction includes an instruction for outputting the error log to the error storage unit 42b. The error log is information for identifying the condition code setting instruction supplying the condition code that does not match the condition code obtained by the condition code obtaining function unit 34b.

Figure 9:
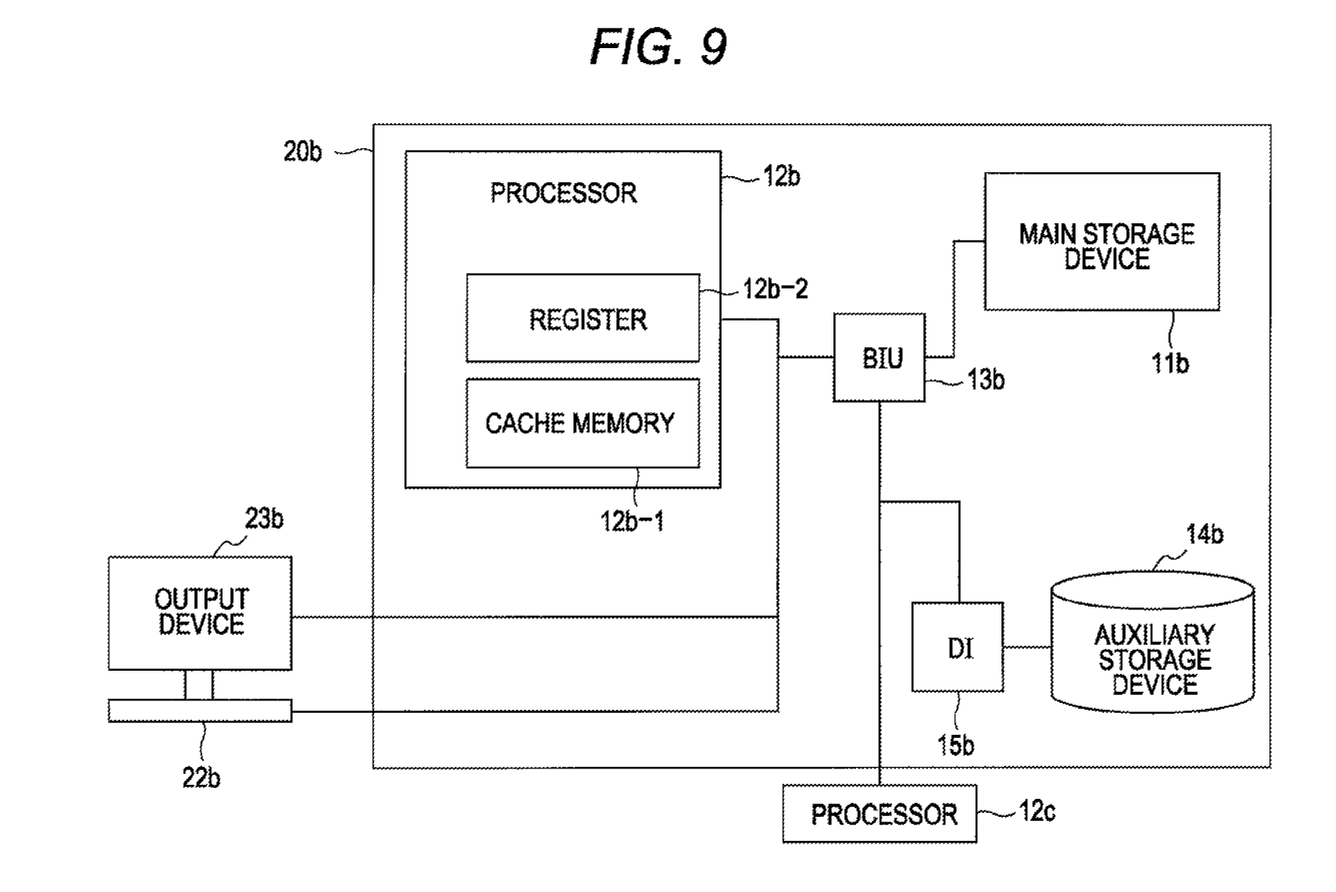
FIG. 9 illustrates a hardware configuration of the processor test apparatus according to a second embodiment of the invention.

The processor test apparatus 20b and processor 12c of FIG. 9 perform the processing of FIGS. 4 to 8, and the processor test apparatus 20b and processor 12c have the above-described action and effect. The processor test apparatus 20b causes the processor 12c that is the test target to execute the test instruction sequence 250, whereby the processor test apparatus 20b may act as the apparatus that tests the externally-attached processor 12c.

What is claimed is:

1. A processor test apparatus that tests a processor, the apparatus comprising:
   a code obtaining unit that executes a test instruction of a test instruction sequence for testing the processor, and obtains a condition code set by a condition code setting instruction of the test instruction sequence;
   an instruction adding unit that produces a condition branching instruction branching to an error output instruction when a condition code that does not match the obtained condition code is supplied, and adds the produced condition branching instruction to the end of the condition code setting instruction of the test instruction sequence; and
   an instruction executing unit that causes the processor to execute the test instruction sequence to which the condition branching instruction is added by an advanced control scheme.

2. The processor test apparatus according to claim 1, wherein the error output instruction includes an information output instruction identifying a condition code setting instruction in which a condition code that does not match the obtained condition code is set.

3. The processor test apparatus according to claim 1, wherein the instruction adding unit adds the produced condition branching instruction to the end of an instruction that does not change a condition code, when the number of instructions that do not change the condition code reaches a specific value after the condition code setting instruction.

4. The processor apparatus according to claim 1, wherein the code obtaining unit obtains the condition code by adding an interruption instruction for obtaining the condition code to the end of the condition code setting instruction of a randomly-produced test instruction sequence, and by executing the interruption instruction.

5. A processor test method of testing a processor, the method comprising:
   executing each test instruction of a test instruction sequence for testing the processor to obtain a condition code set by a condition code setting instruction of the test instruction sequence;
   producing a condition branching instruction branching to an error output instruction in a condition when a condition code that does not match the obtained condition code is supplied;
   adding the produced condition branching instruction to the end of the condition code setting instruction in the test instruction sequence; and
   executing the test instruction sequence to which the condition branching instruction is added, by an advanced control scheme.

6. The processor test method according to claim 5, wherein the error output instruction includes an information output instruction identifying a condition code setting instruction in which a condition code that does not match the obtained condition code is set.

7. The processor test method according to claim 5, wherein, in the adding, the produced condition branching instruction is added to the end of an instruction that does not change a condition code, when the number of instructions that do not change the condition code reaches a specific value after the condition code setting instruction.

8. The processor test method according to claim 5, wherein an interruption instruction for obtaining the condition code is added to the end of the condition code setting instruction of the randomly-produced test instruction sequence, and the interruption instruction is executed to obtain the condition code.

9. A non-transitory computer-readable recording medium having stored therein a processor test program for testing a processor for causing a computer to execute a process comprising:
   executing a test instruction of a test instruction sequence to obtain a condition code set by a condition code setting instruction of the test instruction sequence for testing the processor;
   producing a condition branching instruction;
   adding the produced condition branching instruction branching to an error output instruction when a condition code that does not match the obtained condition code is supplied to the end of the condition code setting instruction of the test instruction sequence; and
   executing, by an advanced control scheme, a test instruction sequence in which the condition branching instruction is added.

10. The computer-readable recording medium according to claim 9, wherein the error output instruction includes an information output instruction identifying a condition code setting instruction, and a condition code that does not match the obtained condition code is set in the condition code setting instruction.

11. The computer-readable recording medium according to claim 9, wherein, the computer includes the processor.

* * * * *